(12) United States Patent
Tolley

(10) Patent No.: US 12,351,344 B2
(45) Date of Patent: Jul. 8, 2025

(54) NUCLEAR THERMAL PROPULSION SYSTEM WITH REACTOR DIRECT DRIVE OF CRYOCOOLER TURBINE

(71) Applicant: Blue Origin Manufacturing, LLC, Huntsville, AL (US)

(72) Inventor: Zachary Reid Tolley, Kent, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/949,069

(22) Filed: Nov. 15, 2024

(65) Prior Publication Data

US 2025/0066045 A1 Feb. 27, 2025

Related U.S. Application Data

(63) Continuation of application No. 18/632,124, filed on Apr. 10, 2024, now Pat. No. 12,234,042, which is a continuation of application No. 17/808,256, filed on Jun. 22, 2022, now Pat. No. 11,975,870.

(51) Int. Cl.
| | |
|---|---|
| *B64G 1/40* | (2006.01) |
| *F02K 9/42* | (2006.01) |
| *F02K 9/44* | (2006.01) |
| *F02K 9/50* | (2006.01) |
| *F02K 9/64* | (2006.01) |
| *G21D 5/02* | (2006.01) |
| *F02K 9/46* | (2006.01) |

(52) U.S. Cl.
CPC .............. *B64G 1/408* (2013.01); *F02K 9/42* (2013.01); *F02K 9/425* (2013.01); *F02K 9/44* (2013.01); *F02K 9/50* (2013.01); *F02K 9/64* (2013.01); *G21D 5/02* (2013.01); *F02K 9/46* (2013.01)

(58) Field of Classification Search
CPC ........... B64G 1/402; B64G 1/408; F02K 9/42; F02K 9/44; F02K 9/46; F02K 9/605
See application file for complete search history.

(56) References Cited

U.S. PATENT DOCUMENTS

| | | | |
|---|---|---|---|
| 3,122,882 | A | 3/1964 | Schultz et al. |
| 5,636,512 | A | 6/1997 | Culver |
| 6,101,808 | A | 8/2000 | Knuth et al. |

(Continued)

FOREIGN PATENT DOCUMENTS

| | | |
|---|---|---|
| CN | 110963084 | 4/2020 |
| CN | 109677639 | 8/2020 |

(Continued)

OTHER PUBLICATIONS

Zagarol, Mark, High-capacity turbo-Brayton cryocoolers for space applications, 2006, Cryogenics, 46, 169-175 (Year: 2006).*

(Continued)

*Primary Examiner* — Kyle Robert Thomas
(74) *Attorney, Agent, or Firm* — Knobbe, Martens, Olson & Bear, LLP

(57) ABSTRACT

Systems and methods for nuclear reactor direct drive of a cryocooler turbine. A nuclear thermal propulsion (NTP) system may have a nuclear reactor that heats a thermal working fluid for directly driving the turbine to power a cryogenic fluid management (CFM) system for keeping propellant at cryogenic temperatures. The features may be used on NTP rockets. The propellant may be liquid hydrogen.

20 Claims, 3 Drawing Sheets

(56) References Cited

U.S. PATENT DOCUMENTS

| | | | |
|---|---|---|---|
| 6,769,242 B1 * | 8/2004 | Balepin | F02K 9/48 60/257 |
| 7,216,834 B2 * | 5/2007 | D'Ausilio | B64G 1/413 244/172.5 |
| 7,413,148 B2 * | 8/2008 | Behrens | B64G 1/4024 244/172.3 |
| 8,893,514 B2 * | 11/2014 | Valentian | B64G 1/4021 62/50.3 |
| 9,068,562 B1 | 6/2015 | Budica et al. | |
| 9,346,565 B1 | 5/2016 | Hardy et al. | |
| 9,964,073 B1 | 5/2018 | Pinera et al. | |
| 11,975,870 B2 | 5/2024 | Tolley | |
| 2016/0032904 A1 | 2/2016 | Kaplan et al. | |
| 2019/0309996 A1 * | 10/2019 | Chancery | F25B 19/005 |
| 2020/0273588 A1 | 8/2020 | Venneri et al. | |
| 2020/0365290 A1 | 11/2020 | Fisher et al. | |
| 2020/0373028 A1 | 11/2020 | Inman et al. | |
| 2023/0415926 A1 | 12/2023 | Tolley | |
| 2024/0278938 A1 | 8/2024 | Tolley | |

FOREIGN PATENT DOCUMENTS

| | | | |
|---|---|---|---|
| FR | 2640322 | 6/1990 | |
| FR | 2640322 A1 * | 6/1990 | F02K 9/48 |
| JP | 2007-40768 | 2/2007 | |
| RU | 2 742 516 | 2/2021 | |
| WO | WO 2005/073085 | 8/2005 | |

OTHER PUBLICATIONS

Borowski et al. "Nuclear Thermal Rocket/Vehicle Characteristics and Sensitivity Trades for NASA's Mars Design Reference Architecture (DRA) 5.0 Study." Proceedings of Nuclear and Emerging Technologies for Space 2009. Atlanta, GA, Jun. 14-19, 2009. Paper 203599. 11 pages.

Borowski et al. "Nuclear Thermal Propulsion (NTP): A Proven Growth Technology for Human NEO / Mars Exploration Missions." 2012. 20 pages.

Plachta et al. "NASA Cryocooler Technology Developments and Goals to Achieve Zero Boil-Off and to Liquefy Cryogenic Propellants for Space Exploration." 13 pages. 2017.

Ryan et al. "Integrated System Modeling for Nuclear Thermal Propulsion (NTP)." NASA Glenn Research Center, Cleveland, OH, 44135. 15 pages.

UAH modeling the spacecraft for NASA's nuclear thermal propulsion idea. Nov. 13, 2019 11:20 AM EST, by University of Alabama Huntsville (/institutions/newsroom/147/).

Gonzalo et al., "On the challenge of a century lifespan satellite," Progress in Aerospace Sciences, vol. 70, p. 28-41 (2014).

Zargol et al., "High-capcity turbo-Brayton cryocoolers for space applications," Cryogenics, 46, pp. 169-175; 7 pages. (2006).

* cited by examiner

NUCLEAR THERMAL PROPULSION SYSTEM WITH REACTOR DIRECT DRIVE OF CRYOCOOLER TURBINE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application is a continuation of U.S. patent application Ser. No. 18/632,124, entitled NUCLEAR THERMAL PROPULSION SYSTEM WITH REACTOR DIRECT DRIVE OF CRYOCOOLER TURBINE, filed Apr. 10, 2024, which is a continuation of U.S. patent application Ser. No. 17/808,256, entitled NUCLEAR THERMAL PROPULSION SYSTEM WITH REACTOR DIRECT DRIVE OF CRYOCOOLER TURBINE, filed Jun. 22, 2022, now U.S. Pat. No. 11,975,870 issued on May 7, 2024, the entire content of each of which is incorporated by reference herein for all purposes and forms a part of this specification.

BACKGROUND

Field of the Invention

The technology relates to rockets, in particular to nuclear thermal propulsion systems.

Description of the Related Art

Nuclear thermal propulsion systems can provide propulsive forces for spacecraft and rockets. Cryocoolers are used in such systems for maintaining cryogenic propellants, such as hydrogen, in a liquid state. Existing solutions have multiple power conversion steps, resulting in inefficiencies. For example, conventional systems use photovoltaic arrays to provide electrical power to a motor to drive the rotating components of a reverse-turbo brayton cryocooler. Each conversion step generates waste heat, and requires a separate independent power system, which in the case of photovoltaics is dependent on illumination and batteries to provide power through eclipse. There is, therefore significant benefits to be had if a nuclear thermal propulsion system could be directly utilized to provide the motive force for its cryocooler.

SUMMARY

Various embodiments of systems, methods, and devices within the scope of the appended claims each have several aspects, no single one of which is solely responsible for the desirable attributes described herein. Without limiting the scope of the appended claims, some prominent features are described herein.

Disclosed herein are features for nuclear thermal propulsion (NTP) systems having a cryogenic fluid management (CFM) system with a cryocooler. The system uses liquid hydrogen as the propellant, which for some space missions must be stored for years or decades. This long storage time presents the problem of boil-off of the liquid hydrogen in the vacuum of space. The NTP system described herein uses a nuclear reactor to heat a working thermal fluid that is used to directly drive a turbine of the cryocooler. This system results in minimal boil off of the liquid hydrogen. The system also produces less waste heat compared to using photovoltaic or solar arrays, or reactor-driven electrical power generators, to provide electrical power to run active CFM systems.

In one aspect, a method for operating a cryocooler turbine in a nuclear thermal propulsion (NTP) rocket is described. The method comprises: heating a first thermal working fluid via thermal communication of the first thermal working fluid with a nuclear reactor core of the NTP rocket; circulating the first thermal working fluid along a first fluid circuit to a cryocooler turbine of a cryogenic fluid management (CFM) system; driving the cryocooler turbine with the heated first thermal working fluid; driving a first compressor of the CFM system via a shaft rotated by the cryocooler turbine; circulating the first thermal working fluid from the cryocooler turbine along the first fluid circuit and through the first compressor; circulating the first thermal working fluid from the first compressor back to thermal communication with the nuclear reactor core; cooling a second thermal working fluid via thermal communication of the second thermal working fluid with a heat exchanger; circulating the second thermal working fluid along a second fluid circuit to a cryogenic tank storing propellant; cooling the propellant via thermal communication of the second thermal working fluid with the cryogenic tank; driving a second compressor of the CFM system via the shaft rotated by the cryocooler turbine; circulating the second thermal working fluid from the cryogenic tank along the second fluid circuit and through the second compressor; and circulating the second thermal working fluid from the second compressor back to thermal communication with the heat exchanger.

Various embodiments of the various aspects may be implemented. For example, the method may further comprise operating the cryocooler turbine in the NTP rocket for multiple years. The first thermal working fluid may be He—Xe. The second thermal working fluid may be liquid He. The propellant may be liquid hydrogen.

In another aspect, a method for powering a cryogenic fluid management (CFM) system in a nuclear thermal propulsion (NTP) rocket is described. The method comprises heating a first thermal working fluid via thermal communication of the first thermal working fluid with a nuclear reactor core of the NTP rocket; driving a cryocooler turbine of the CFM system using the heated first thermal working fluid; and maintaining a cryogenic temperature of propellant using the driven cryocooler turbine.

Various embodiments of the various aspects may be implemented. For example, the method may further comprise driving a first compressor via a shaft rotated by the cryocooler turbine. The method may further comprise circulating the first thermal working fluid through the first compressor. The method may further comprise circulating the first thermal working fluid back to thermal communication with the nuclear reactor core. The method may further comprise maintaining the cryogenic temperature of the propellant by circulating a second working fluid in thermal communication with the propellant. The method may further comprise the cryocooler turbine driving a second compressor through which the second working fluid circulates. The method may further comprise powering the CFM system in the NTP rocket for multiple years. The first thermal working fluid may be He—Xe. The second thermal working fluid may be liquid He. The propellant may be liquid hydrogen.

In another aspect, a system for powering a cryogenic fluid management (CFM) system in a nuclear thermal propulsion (NTP) rocket is described. The system comprises a nuclear reactor core configured to heat a first thermal working fluid, a cryocooler turbine configured to be directly driven by the heated first thermal working fluid, and a cryogenic management system (CFM) configured to be powered by the driven cryocooler turbine.

Various embodiments of the various aspects may be implemented. For example, the system may further comprise a first compressor configured to be driven by the cryocooler turbine via a shaft and through which the first thermal working fluid circulates. The CFM may further include a second compressor configured to be driven by the cryocooler turbine via a shaft and through which a second thermal working fluid circulates that cools propellant stored in a cryogenic tank. The first thermal working fluid may be He—Xe and the second thermal working fluid may be liquid He. The propellant may be liquid hydrogen.

BRIEF DESCRIPTION OF THE DRAWINGS

These and other aspects of the present disclosure will be described in the detailed description and the appended claims that follow, and in the accompanying drawings.

Figure 1:
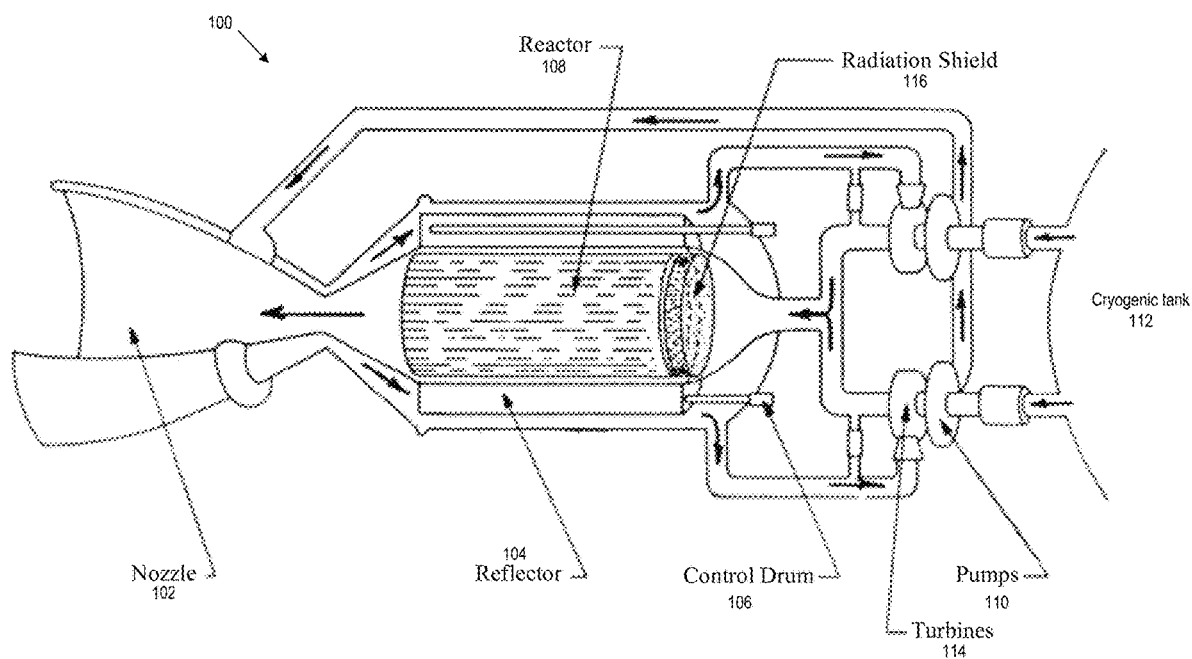
FIG. 1 is a partial schematic of an embodiment of a nuclear thermal propulsion (NTP) rocket.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Although certain embodiments and examples are disclosed below, inventive subject matter extends beyond the specifically disclosed embodiments to other alternative embodiments and/or uses and to modifications and equivalents thereof. Thus, the scope of the claims that may arise herefrom is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

A. Example Nuclear Thermal Propulsion (NTP) Rocket

FIG. 1 is a partial schematic of an embodiment of a nuclear thermal propulsion (NTP) rocket 100. The NTP rocket 100 may include a nuclear reactor 108 configured to heat propellant. The heated propellant may be expelled through a nozzle 102, converting the thermal energy to kinetic energy and applying a propulsive force to the NTP rocket 100 in the opposite direction of expulsion of the propellant. Propellant, such as liquid hydrogen, may be stored in a cryogenic tank 112 (partially shown). A combination of pump(s) 110 and turbine(s) 114 may be configured to drive compressed or pressurized cryogenic fluid to cool the engine nozzle 102 and thereby partially heat the cryogenic fluid. In some configurations, heat exchange from the cooled structures of the engine may heat the propellant, which may then drive the turbine(s) 114. Turbine exhaust consisting of the heated propellant may be routed towards a radiation shield 116 and through the reactor 108 before being expelled out the nozzle 102. This resulting propulsive force results in thrust to propel the NTP rocket 100, which may be in space. The NTP rocket 100 may additionally include a neutron reflector 104 and control drums 106 to regulate neutron population and reactor power.

B. Example Cryogenic Fluid Management (CFM) System

Figure 2:
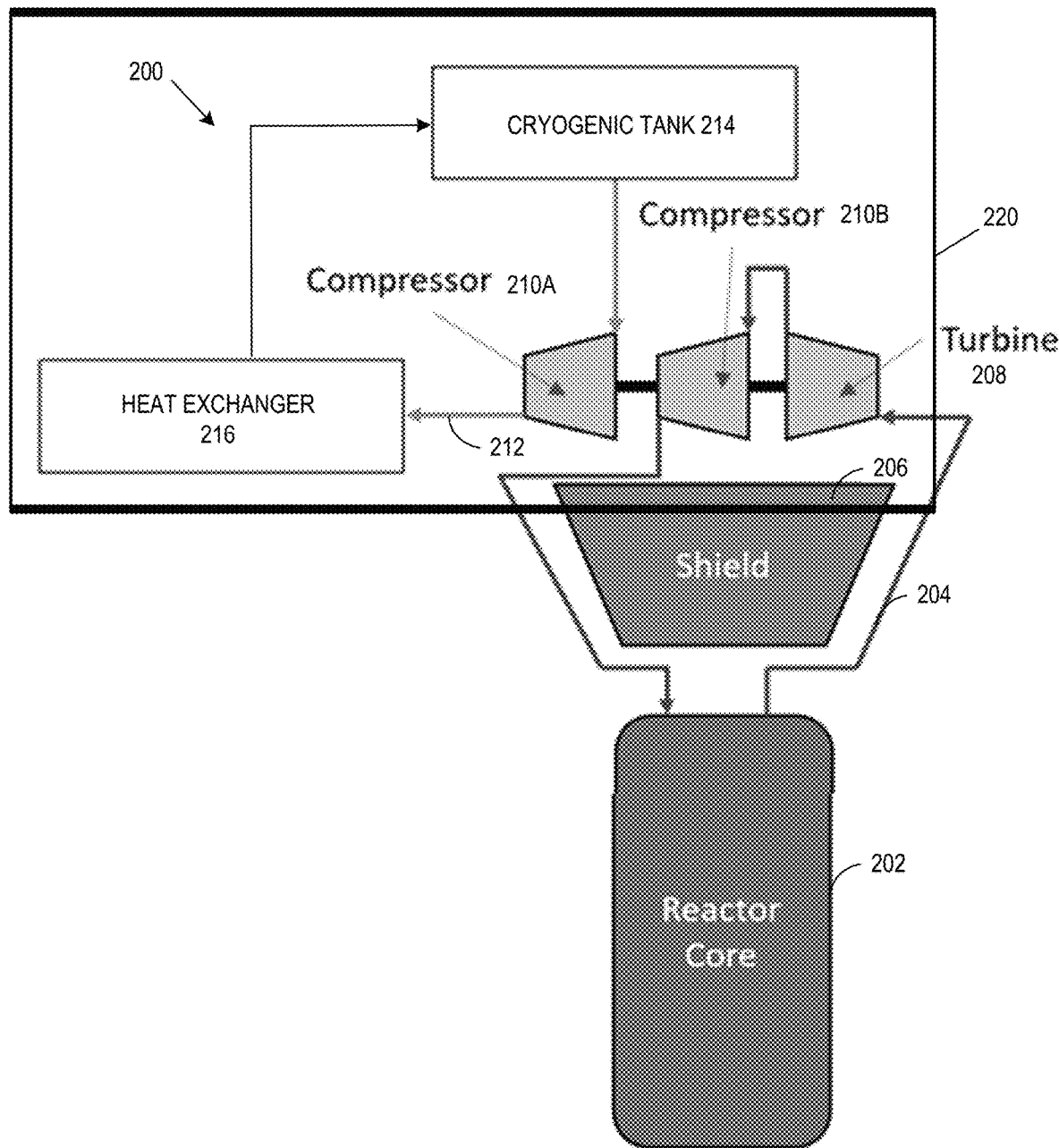
FIG. 2 is a schematic of an embodiment of a cryogenic fluid management (CFM) system with a nuclear reactor direct drive cryocooler turbine that may be used with the NTP rocket of FIG. 1.

FIG. 2 is a schematic of an embodiment of a cryogenic fluid management (CFM) system 200. The CFM system 200 may be used with the NTP rocket 100. The NTP rocket 100 requires a propellant, such as liquid hydrogen, in order to operate at high specific impulses. However, in some embodiments the NTP rocket 100 will operate for long periods of time, such as years or decades. Thus, the NTP rocket 100 must store the liquid hydrogen with minimal boil off in the environment of space. Such environment includes a vacuum, as well as extremely high temperatures when exposed to the sun. The CFM system 200 may be used to thermally manage a cryocooler and maintain the propellant at a cryogenic temperature while minimizing boil off.

The CFM system 200 may thus include a cryocooler configured to cool the propellant. To power the cryocooler and/or other parts of the CFM system, conventional NTP systems utilize either photovoltaic arrays or reactor heated fluid loops to turn generators, which in turn provide power to electrically driven cryocoolers and driven generators to provide electrical power to run active CFM systems. These conventional approaches result in inefficiencies and additional heat rejection requirements, since these designs require multiple carnot limited energy conversion steps. The CFM system 200 described herein may use the NTP rocket reactor 108 throttled to a low thermal output state (notionally 1% of rated thermal output) to heat a working fluid that can then be used directly to drive the turbine of a cryocooler and/or other components of the CFM system 200. Advantageously, the CFM system 200 and associated methods described herein are simpler and produce less waste heat than with photovoltaic arrays or reactor driven generators.

As shown in FIG. 2, the CFM system 200 may include a nuclear reactor core 202 and a cryocooler 220. The cryocooler 220 includes a turbine 208 configured to drive one or more compressors 210A, 210B via a shaft. Thermal working fluid heated by the reactor core 202 drives the turbine 208, which through a common shaft provides the motive force for the cryocooler compressor 210A to maintain the cryogenic temperature of the propellant in a cryogenic tank 214, as further described. The turbine, compressor, and recuperators of the reverse turbo-Brayton crycocooler are co-located with the NTP system's turbomachinery, in crewed applications behind a shadow shield which provides shielding from the neutron flux generator by the operating reactor. Bypass valves enable the flow of coolant either through tie tubes or analogous structures within the reactor, or through dedicated channels in a moderator block.

One or more thermal working fluids may circulate through the CFM system 200, such as a cryogenic working fluid and a turbine working fluid. In some embodiments, the cryogenic working fluid may be super-critical He. The cryogenic working fluid may be configured to cool propellant in the cryogenic tank 214. In some embodiments, the turbine working fluid will be a fluid composed of a mixture of helium and xenon in ratios that very depending on desired turbine output up to potentially pure xenon. The turbine working fluid may be configured to drive the turbine 208 of the cryocooler 220.

As illustrated in FIG. 2, the CFM system 200 may include two or more thermal working fluid circuits. In fluid circuit 204, the CFM system 200 may be configured to circulate the turbine working fluid between the reactor core 202, turbine 208, and the compressor 210B. The turbine working fluid may be heated to a vapor via thermal communication with the nuclear reactor core 202. The working fluid's heat pick up in the core will be through either passages in the tie-tubes that are re-purposed from turbopump drive through the use of bypass valves or through dedicated flow passages in a moderator block. The hot working fluid then flows to the turbine 208 to rotate the turbine. The turbine working fluid then flows through the compressor 210B and flows back into the core in a close circuit. The lower temperature liquid turbine working fluid then flows back to the reactor core 202 and repeats the cycle.

A fluid circuit 212 may be configured to have the cryogenic working fluid circulate therein. The cryogenic working fluid may be in thermal communication with the cryogenic tank 214, where heat is transferred from the propellant in the tank 214 to the cryogenic working fluid in the circuit 212 to cool the propellant. The heated cryogenic working fluid then flows to the compressor 210A where it is compressed and then flows to a heat exchanger 216 where the fluid is cooled. The cooled cryogenic working fluid then flows through a Jules Thompson orifice reducing the helium temperature to below 20K (Kelvin) prior to flowing back to the cryogenic tank 214 to repeat the cycle.

The CFM system 200 may include a shield 206. The shield is a disc composed of tungsten and lithium hydride to both reduce the total radiation dose on the cryocooler components and limit the gamma and neutronic heating of the bulk hydrogen present in the tank.

In some embodiments, the turbine 208 power may be used to drive electricity generation for general space craft power usage, in addition to directly driving the cryocooler, such as using various "bimodal" NTP concepts. This would enable a common set of rotating components to both mechanically drive a cryocooler as well as provide electrical power for other spacecraft systems.

C. Example Method of Reactor Direct Drive Cryocooler

Figure 3:
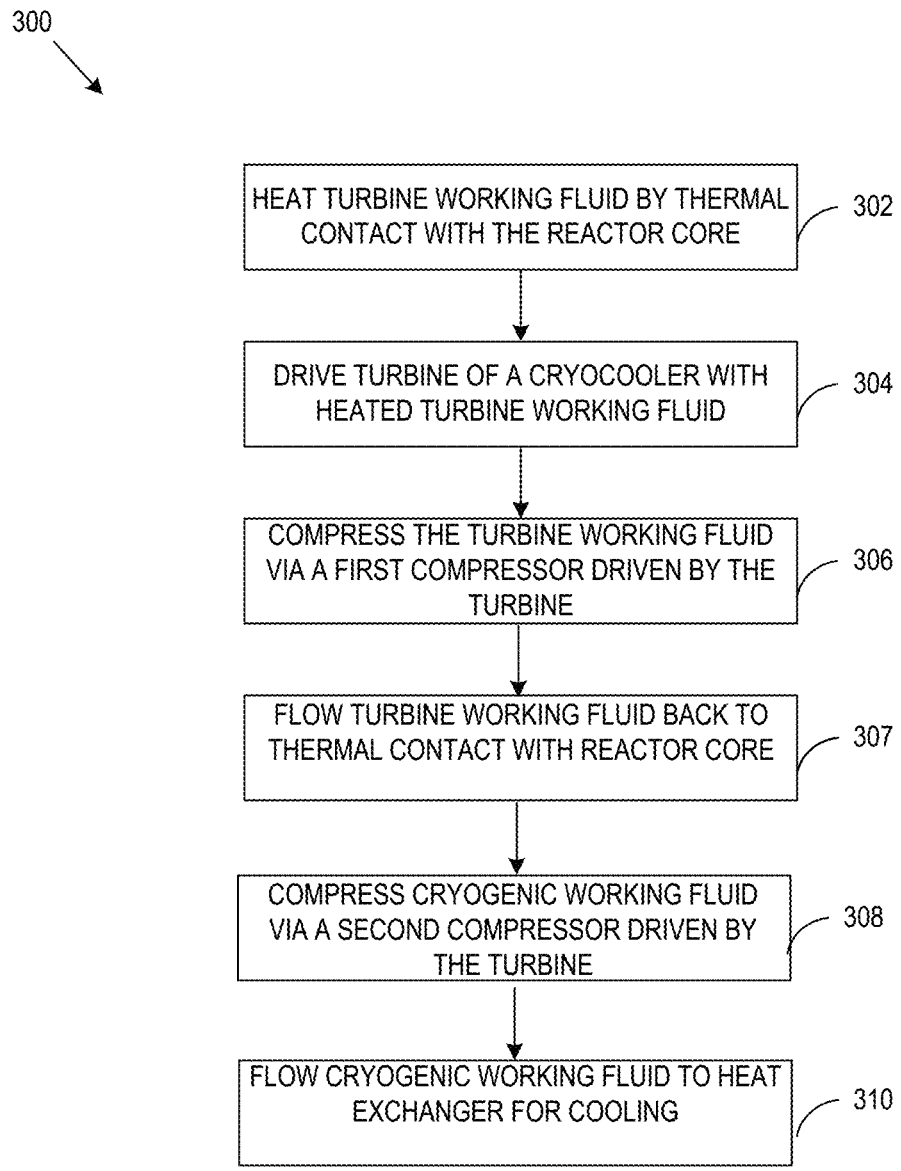
FIG. 3 is a flow chart showing an embodiment of a method of operating a CFM system with a direct drive cryocooler turbine that may be performed by the system of FIG. 2.

FIG. 3 is a flow chart showing an embodiment of a method 300 of operating a CFM system with a direct drive cryocooler turbine. The method 300 may be performed by the CFM system 200.

The method 300 begins with step 302 where a turbine working fluid is heated by thermal contact with a reactor core. The thermal contact may be thermal communication via a heat exchanger that is in thermal communication with the reactor core. Step 302 may include the turbine working fluid in the fluid circuit 204 heated by the reactor core 202.

The method 300 then moves to step 304 where the heated turbine working fluid is used to directly drive a turbine of a cryocooler. The fluid may flow along the fluid circuit 204 to the turbine 208 of the cryocooler 220. The turbine may rotate a shaft due to the heated vaporous turbine working fluid. Thus, thermal or hydraulic energy of the turbine working fluid may be converted to mechanical or kinetic energy of the turbine.

The method 300 then moves to step 306 where the turbine drives a first compressor to increase the pressure of the turbine working fluid before it flows back to the reactor core. In step 206, the turbine working fluid may flow from the turbine along the fluid circuit to the compressor. The turbine may drive the compressor via the shaft rotated by the turbine. The turbine 208 may drive the compressor 210B via the turbine working fluid flowing along the fluid circuit 204.

The method 300 may then move to step 307 where the turbine working fluid flows back to thermal contact with the reactor core. The fluid may flow along the circuit 204. The fluid may then be heated by the reactor core as described in step 302.

The method 300 then moves to step 308 where the turbine drives a second compressor to increase the pressure of a cryogenic working fluid. The turbine 208 may drive the compressor 210A. The turbine may rotate the shaft that drives the compressor of the CFM system to thermally control a cryogenic tank, such as the tank 214, to maintain the cryogenic temperature of the propellant. The fluid may flow along the circuit 212 from thermal contact with the cryogenic tank to the compressor 210A.

The method 300 then moves to step 310 where the cryogenic working fluid flows to the heat exchanger to cool the cryogenic working fluid. The fluid may flow along the fluid circuit 212 from the compressor 210A to the heat exchanger 216. The cooled fluid may then flow from the heat exchanger to the cryogenic tank, such as the tank 214, to maintain the propellant at cryogenic temperatures.

D. Terminology

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics can be combined in any suitable manner, as would be apparent to one of ordinary skill in the art from the present disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the present disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Although described in the illustrative context of certain embodiments and examples, it will be understood by those skilled in the art that the present disclosure extends beyond the specifically described embodiments to other alternative embodiments and/or uses and obvious modifications and equivalents. Thus, it is intended that the scope of the claims which follow should not be limited by the particular embodiments described above.

What is claimed is:

1. A method of operating a spacecraft having a cryogenic fluid management (CFM) system, the method comprising:
   driving a cryocooler turbine of the CFM system using a heated first thermal working fluid;
   maintaining a cryogenic temperature of propellant using the cryocooler turbine;
   pumping the propellant along a nuclear reactor core of the spacecraft, thereby heating the propellant; and
   expelling the propellant to provide thrust to the spacecraft.

2. The method of claim 1, wherein the heated first thermal working fluid is heated by the nuclear reactor core of the spacecraft.

3. The method of claim 1, further comprising driving a first compressor via a shaft rotated by the cryocooler turbine and circulating the first thermal working fluid through the first compressor.

4. The method of claim 1, further comprising circulating the first thermal working fluid back to thermal communication with the nuclear reactor core of the spacecraft.

5. The method of claim 1, wherein maintaining the cryogenic temperature of the propellant comprises circulating a second thermal working fluid in thermal communication with the propellant.

6. The method of claim 5, wherein the cryocooler turbine drives a second compressor through which the second thermal working fluid circulates.

7. The method of claim 5, wherein the first thermal working fluid is He—Xe and the second thermal working fluid is liquid He.

8. The method of claim 1, wherein the propellant is liquid hydrogen.

9. The method of claim 1, wherein the spacecraft comprises a nuclear thermal propulsion rocket.

10. A spacecraft comprising:
    a cryocooler turbine configured to be directly driven by a first thermal working fluid heated by a nuclear reactor core of the spacecraft;
    a cryogenic fluid management (CFM) system powered by the cryocooler turbine to thereby maintain a liquid state of propellant while stored in a cryogenic tank;
    a fluid circuit configured to pump the propellant from the cryogenic tank along the nuclear reactor core, thereby heating the propellant; and
    a nozzle configured to expel therefrom the heated propellant to produce a specific impulse.

11. The spacecraft of claim 10, wherein the CFM system comprises one or more compressors configured to be mechanically driven by the cryocooler turbine.

12. The spacecraft of claim 10, wherein the CFM system further comprises a second thermal working fluid that cools the propellant stored in the cryogenic tank.

13. The spacecraft of claim 10, wherein the CFM system further comprises a heat exchanger.

14. The spacecraft of claim 10, wherein the propellant is liquid hydrogen.

15. The spacecraft of claim 10, further comprising a radiation shield.

16. The spacecraft of claim 10, wherein the CFM system comprises a reverse turbo-Brayton cryocooler.

17. A spacecraft comprising:
    a first fluid circuit configured to convey a first thermal working fluid in thermal communication with a reactor;
    a turbine configured to be directly driven by the first thermal working fluid;
    a cryogenic tank configured to store a propellant;
    a second fluid circuit configured to convey the propellant along the reactor, and wherein the turbine is configured to affect a temperature of the propellant; and
    a nozzle configured to expel the propellant conveyed along the reactor.

18. The spacecraft of claim 17, further comprising a compressor configured to be mechanically driven by the turbine and through which the first thermal working fluid is configured to circulate via the first fluid circuit.

19. The spacecraft of claim 17, further comprising a compressor configured to be mechanically driven by the turbine and through which the propellant is configured to circulate via the second fluid circuit.

20. The spacecraft of claim 17, wherein the nozzle is a rocket nozzle.

* * * * *